United States Patent
Garcia-Burgos et al.

(10) Patent No.: US 10,865,160 B2
(45) Date of Patent: Dec. 15, 2020

(54) NUTRIENT-CONTAINING POROUS BIODEGRADABLE BEAD

(71) Applicant: PRatian, LLC, Santa Isabel, PR (US)

(72) Inventors: Axel Garcia-Burgos, Santa Isabel, PR (US); Yoliem S. Miranda-Alanon, Somerset, NJ (US)

( * ) Notice: Subject to any disclaimer, the term of this patent is extended or adjusted under 35 U.S.C. 154(b) by 230 days.

(21) Appl. No.: 16/129,393

(22) Filed: Sep. 12, 2018

(65) Prior Publication Data

US 2019/0135711 A1    May 9, 2019

Related U.S. Application Data

(60) Provisional application No. 62/557,658, filed on Sep. 12, 2017.

(51) Int. Cl.
| | |
|---|---|
| *C05G 5/00* | (2020.01) |
| *C05G 5/30* | (2020.01) |
| *B01J 13/18* | (2006.01) |
| *C05B 17/00* | (2006.01) |

(52) U.S. Cl.
CPC .............. *C05G 5/38* (2020.02); *B01J 13/18* (2013.01); *C05B 17/00* (2013.01)

(58) Field of Classification Search
CPC .............. C05G 5/38; B01J 13/18; C05B 17/00
See application file for complete search history.

(56) References Cited

U.S. PATENT DOCUMENTS

2011/0059166 A1 * 3/2011 Gaserod ................. A23K 40/30
424/452

FOREIGN PATENT DOCUMENTS

CN    106431612 A *  2/2017

* cited by examiner

*Primary Examiner* — Jennifer A Smith
(74) *Attorney, Agent, or Firm* — Eugenio J. Torres-Oyola; Victor M. Rodriguez-Reyes; Rafael Rodriguez-Muriel

(57) ABSTRACT

The present disclosure relates to a nutrient-containing porous biodegradable bead comprising the following components: an Aloe Vera and cellulose composite matrix containing a nutrient solution including, but not limited to, nitrogen, phosphorus, potassium, sodium alginate, and calcium chloride.

7 Claims, 5 Drawing Sheets

NUTRIENT-CONTAINING POROUS BIODEGRADABLE BEAD

CROSS REFERENCE TO RELATED APPLICATIONS

The present application claims priority to U.S. Provisional Patent Application No. 62/557,658, filed on Sep. 12, 2017, the contents of which are hereby incorporated by reference.

FIELD OF INVENTION

The present disclosure relates to nutrient delivery mechanisms and formulations for soils. Particularly, an embodiment disclosed is a nutrient-containing porous biodegradable bead comprising the following components: an Aloe Vera and cellulose composite matrix containing a nutrient solution comprising, nitrogen, phosphorus, potassium, sodium alginate, and calcium chloride. The bead is biodegradable and designed to supplement agricultural soil via gradual degradation of the bead and gradual release of water and nutrients into the surrounding soil of a plant. The bead is designed to simultaneously provide sufficient water and nutrient supplement to support plant growth such that farmers/growers: (1) reduce waste of water and nutrient resources; and (2) treat their soil with an environmentally and ecologically sustainable supplement that is entirely biodegradable.

DESCRIPTION OF RELATED ART

To address the need to cultivate inarable environments and support agricultural productivity without exacerbating water insecurity, disclosed is a biodegradable, ecologically and environmentally sustainable eco-fertilizer in both design and function. This self-contained hydration and nutrient supplement is designed to provide Nitrogen, Phosphate, and Potassium (NPK) nutrient and water supplement to soil for personal and industrial agriculture. The bead concentrates nutrition and hydration requirements for plant growth into a biopolymeric hydrogel bead, tempered for gradual dispensing of water and nutrients into soil. There are several marketed and prior art references available in this field of invention that are designed to provide water and other supplements to soil. However, these products do not necessarily completely degrade; may contain synthetic and possibly toxic products; and do not supply water and nutrients as a combined supplement.

Marketed products in this field of invention include: Stockosorb, Aquagel, Miracle-Gro Water Crystals and Hydrosource. These products are salt or gel water-absorbent materials that retain water within the soil of the surrounding plant by absorbing water supplied by rain/irrigation, previously lost as waste. Water gradually releases from these materials into the surrounding soil, supporting plant growth. Thus, these products reduce water loss, but do not provide nutrient supplement. On the other hand, the product marketed as Miracle-grow All-purpose Soluble Fertilizer is a soil nutrient supplement which provides standard NPK mineral supplement to soil, but does not provide water supplementation. Accordingly, no existing marketed products provide both water and nutrient supplement to soils.

As noted above, several prior art references exist in this field of invention that are designed to supplement soil with controlled nutrient release. These references include: (1) Publication No. WO2014091279A1, which discloses supplying a renewable and organic controlled-release nitrogenous soil supplement; (2) U.S. Pat. No. 6,139,597 which discloses supplying a water-soluble fertilizer supplement within a water-insoluble polymer coating designed for gradual nutrient release; (3) U.S. Pat. No. 8,741,022 which incorporates a sulfur coated fertilizer core which is water-insoluble and mediated nutrient release; and (4) U.S. Publication No. 20110296887A1, which discloses releasing hydroxyapatite phosphate (HAP) nanoparticles gradually from within a degrading wood capsule. These products are similar in that they supplement soil with urea as their nitrogen-based supplement, except for U.S. Pat. No. 6,139,597 which lists potential nutrient materials but does not select one for its design. These products are also similar in that none release water as an additional soil supplement. Some of these options include a nutrient core surrounded by a water-insoluble coating (e.g., U.S. Pat. Nos. 8,741,022, 6,139,597) that may contain petroleum-based compounds or other synthetic materials; whereas U.S. Publication No. 20110296887 uses a cellulose-HAP composite as an encapsulating material for its wood and urea nutrient supplement; and Publication No. WO2014091279A1 uses biochar, a charcoal made from agricultural waste as a matrix to contain urea supplement.

The bead is designed such that an NPK and salt nutrient core (NPK fertilizer, sodium alginate, and calcium chloride) is encapsulated in a cellulose-aloe polymer forming a hydrogel bead. Not disclosed by the prior art is the fact that the sodium alginate and calcium chloride core materials serve as biocompatible, water-absorbent, materials which support the hydrogel structure of the bead. When released in soil, the bead releases nutrient and water, over the course of 60 days. The bead constitutes an improvement over the prior art by providing an entirely organic and water-soluble matrix which completely degrades without toxifying the soil. Further, the bead simultaneously provides water and nutrient supplement, which is not described by aforementioned products or prior art references. Similar to WO2014091279A1 and US20110296887, the bead is designed to be completely biodegradable. The bead improves upon competitive fertilizer supplement designs by providing an entirely organic and water-soluble matrix that gradually releases both nutrient and water to surrounding soil. It combines both water absorbent technology and fertilizer solution in fully biodegradable spherical beads which, as they degrade, release only soluble and organic materials thus making the product sustainable and eco-conscious. Furthermore, the bead differs from the prior art in that the complete list of ingredients, as well as the design and function of the bead, support the product as a unique eco-fertilizer.

As previously discussed, there are several products available on the market today that can help evolve the way nutrients and water is provided effectively to plants. With a combination of a super absorbent material and an aeration material, the ideal substratum can be provided to grow healthy plant on dry soils such as, the Martian soil. Currently in the market, there are two major groups of super absorbent material: (1) polymer-absorbent material, an example of this is sodium polyacrylate, and (2) biodegradable-absorbent material where biodegradable cellulose-based Hydrogels and potassium polyacrylate are two of the most used examples. Table 1 compares the main products available in the market by giving them a score where we take into consideration: price, plant interaction safeness, biodegradability and absorbency.

TABLE 1

Analysis of marketed products in this field of invention. The ranking score has a 3 as the highest and most ideal to 1 being the lowest or less desired option.

| Criteria | Sodium Polyacrylate | Score | Potassium Polyacrylate | Score | Cellulose-based Hydrogels | Score |
|---|---|---|---|---|---|---|
| Economic | $0.34/g | 2 | $0.07/g | 3 | $0.38/g | 1 |
| Doesn't harm plant roots | Yes | 3 | Yes | 3 | Yes | 3 |
| Biodegradable | No | 1 | Yes | 3 | Yes | 3 |
| Superabsorbent | 300 times | 1 | 500 times | 3 | 400 times | 2 |
| Total | | 1 | | 3 | | 2 |

In particular, Table 1 shows a list of criteria useful in determining the efficiency of marketed products in this field of invention. As we follow Table 1, we can see that the highest two scores belong to Potassium polyacrylate and cellulose based hydrogels. These two polymers are economically efficient, they are also safe when it comes to interacting with the root of the plant, both are biodegradable, and have high water retention. Even though Potassium polyacrylate has a higher score, when these hydrogels break down, they release potassium acrylate and acrylamide which is a lethal neurotoxin and has been found to cause cancer in laboratory animals. For that reason, some sellers of Polyacrylate hydrogels promote their products as non-biodegradable.

On the other hand, cellulose based hydrogels are chosen as part of our Embodiment B as this type of hydrogels are made from naturally occurring products (i.e. non-toxic and found in nature). Because the cellulose based hydrogels are fully biodegradable, they can: provide nutrients, as compost, and retain water in soil for longer durations; reduce less pollution when manufacturing and its product can be broken down into nontoxic components; be made from renewable resources and the production process take 65 percent less energy than required to produce petroleum-based plastics. Furthermore, organic waste in landfills generates, methane, a potent greenhouse gas. By using a biodegradable bead as composting material, methane emissions would decrease and the waste in the landfills would decompose at a faster rate. Moreover, biodegradable materials such as the nutrient-containing porous biodegradable bead can serve as a growth habitat for bacterium and feed nutrients to microorganisms in the earth's soil which helps improves contaminated, compacted, and marginal soils.

Table 2 shows a list of the marketed products in this field of invention previously discussed indicating their functionality, material composition, and cost comparison.

TABLE 2

List of marketed products in this field of invention

| Product Name | Functionality | Material Composition | Cost (USD) |
|---|---|---|---|
| Stockosorb | Water absorbent | Crosslinked polyacrylic acid homopolymer partially potassium neutralized | 206 per 25 kg |
| AquaGel | Water absorbent | Co-polymer gel of acrylamide | 200 per 25 kg |
| HydroSource | Water absorbent | Crosslinked acrylamide acrylate co-polymers | 209 per 25 kg |
| Miracle-Gro Water Crystals | Water absorbent | Polyacrylamide, crosslinked | 645 per 25 kg (Miracle-Gro only sells 1 size: $8.72 per 12 ounces [0.33 kg]) |
| Miracle-Gro All Purpose Soluble Fertilizer | Fertilizer product | 24-8-16 NPK, boric acid | 200 per 25 kg (Miracle-Gro's biggest size: $50 per 12.5 pounds [5.7 kg]) |
| Gellan Gum Powder CultureGel™ Type 1-Biotech Grade 1 | Fertilizer product | Gellan Gum, L-Ascorbic Acid | 3,296 USD per 25 kg |

As shown in Table 2, no existing marketed product provides both water and nutrient supplement to soils, as disclosed herein. As such, a nutrient-containing porous biodegradable bead containing these functionalities could sustain plant growth without additional water or fertilizer solution.

SUMMARY OF THE INVENTION

In the study of plants, water is one of the vital components for their growth. As such, the process of growing a crop in certain soils, including those in other planets, can be a difficult task due to the scarcity of water and inefficiency of irrigation. To address this problem, the inventor hereby discloses a biodegradable bead, which is an entirely organic and environmentally sustainable supplement that supplies water and nutrient release from a biopolymeric crosslinked hydrogel. A "biodegradable" product has the ability to break down, safely and relatively quickly, by biological means, into the raw materials of nature and disappear into the environment. These products can be solids biodegrading into the soil (which we also refer to as compostable), or liquids biodegrading into water. Biodegradable plastic is intended to break up when exposed to microorganisms (a natural ingredient such as cornstarch or vegetable oil is added to achieve this result). Thus, the bead enables plants to reach their maximum development without dependency on watering and fertilizing procedures. Other applications of this product in other fields include biofabrication for skin repair, tissue engineering, wound healing applications and drug delivery.

An embodiment of the claimed invention relates to a biopolymer-base capsule, comprising: a capsule, said capsule comprising a shell, wherein said shell encapsulates a plurality of substances; wherein said shell is a biopolymer base matrix comprising an effective combination of sodium alginate and calcium chloride, wherein sodium alginate is at least 1%-5% by weight of the capsule and wherein calcium chloride is at least 1%-5% by weight of the capsule; wherein a first substance of said plurality of substances is water and a second substance of said plurality of substances is a fertilizing material comprising an effective combination of Nitrogen, Phosphorus, and Potassium; and wherein Nitrogen is at least 0.033% by weight of the capsule, Phosphorus is at least 0.033% by weight of the capsule, and Potassium is at least 0.033% by weight of said capsule.

DESCRIPTION OF THE PREFERRED EMBODIMENT

Figure 1:
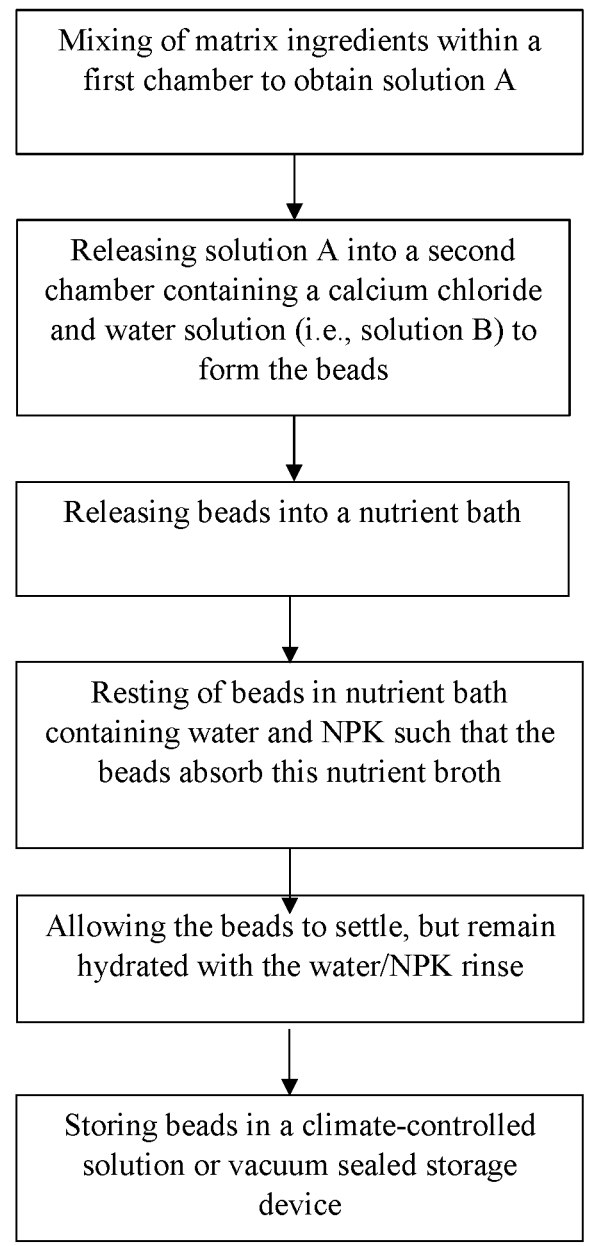
FIG. 1 shows a flowchart of the manufacturing process for the nutrient-containing porous biodegradable bead.

Two proposed embodiments (A & B) are designed with the same manufacturing process; but additional materials are added for Embodiment B in solution A, as water composition of the bead is reduced. In these embodiments, the bead has a weight that varies from 0.091 grams to 0.70 grams; and a diameter that fluctuates from 4 mm to 15 mm. To make these embodiments, the method described below was followed.

Solution A Mixture:

(1) Prepare a 20% wt. solution of cellulose starting from lyophilized cellulose and dilute water as needed to reach a sufficiently hard and mechanically malleable gel.

(2) Clean Aloe Vera leaves with distilled water. Take the leaves and remove the spikes. Separate the epidermis from the gel. The gel will be again washed in distilled water to remove any exudates from the surface. The gel will then be cut in a given diameter depending on the liquid transfer rate.

(3) Using mass units, weigh 25% corresponding proportions of Aloe Vera content to mix with cellulose (ex. If you have a 4.2 g of cellulose and you want to create the 15% proportion solution then 4.2 g*(0.15)=0.63 g of Aloe Vera to weight and add).

(4) Prepare 5 grams to 10 grams of Sodium alginate solution, mix it with water, and add this mixture to solution A.

(5) If Cellulose is not used, prepare 5 grams to 10 grams of Cotton, mix it with water, and add this mixture to solution A.

(6) Dilute 5 grams of fertilizer product NPK with water and add the mixture to solution A. The concentration of NPK to be used can vary, and exact concentration would depend on plant's nutritional needs. Use 20% Nitrogen-20% Phosphorous-20% Potassium for conventional use. In addition, A. arbuscular mycorrhizal fungi (AMF) could be used in liquid form and can be added to solution A. Other fertilizer substances with other concentrations in liquid or powder form can be added depending on plant nutritional needs.

Solution B Mixture:

Repeat steps (1)-(6) and add the following step:

(7) Prepare a 0.25% $CaCl_2$ solution and mix it with water for solution B mixture Transfer droplets of solution A into solution B. Encapsulation is formed when both mixtures crosslink. The bead form will instantaneously be covered by a thin transparent membrane. Filter the products and let them dry under normal conditions.

Manufacturing, Storage and Packaging

The development of the automated manufacturing process is presented and explained here. This process intends to scale-up the bead production which involves:

(1) Mixing of matrix ingredients within a first chamber. This is the stage where the sodium alginate, cellulose or cotton, and Aloe Vera and fertilizer solution are combined in a climate-controlled environment. This is solution A.

(2) Releasing solution A mixture into a second chamber containing a calcium chloride and water solution (i.e., solution B) by adding drops of solution A into solution B to form the beads.

(3) Releasing beads into a nutrient bath through any means capable of carrying beads, such as a perforated nuzzle or shower.

(4) Resting of beads in nutrient bath containing water and NPK such that the beads absorb this nutrient broth. In this stage the beads absorb water and nutrients.

(5) Allowing the beads to settle but remain hydrated with the water/NPK rinse.

(6) Storing beads in a climate-controlled solution or vacuum sealed storage device. Vacuum sealed, or air-tight recyclable containers are shown as a delivery system for manufactured beads. In this embodiment, size of this device is 900 cubic feet and production speed rate is 18,000 kg/year. FIG. 1 shows a flowchart of the above-mentioned steps.

Alternatively, the beads can also be produced through the following steps: a) admixing a sodium alginate solution with water to form a first organic solution, said first organic solution comprising a sodium alginate concentration of at least 1%-5% by weight; b) diluting a fertilizing material in water to form a fertilizing solution; c) admixing said first organic solution of (a) with said fertilizing solution of (b) to form an organic-fertilizing mixture; d) diluting an effective quantity of water-soluble salt in water to form a salt mixture, said salt mixture comprising a salt concentration of at least 1-5% by weight; e) adding, dropwise, said organic-fertilizing mixture into said salt mixture of (c) to form a bead.

Embodiment A

Embodiment A is made by conducting the procedure steps: 4, 6 and 7 discussed for Solution A. For Embodiment B, all steps from the procedure described above are executed for the bead's formation.

For embodiment A, Calcium Chloride and Sodium Alginate are used as the encapsulation material that allows slow release of water and nutrients and the rigid structure of the shelf. Alginate is an anionic polysaccharide widely used in wound healing applications, due to its biocompatibility, biodegradability, excellent film forming properties and easy formation of hydrogels. Sodium alginate hydrogels are attractive materials due to the (i) ability to absorb liquids, maintaining a moist environment; (ii) and the biocompatibility that these ions have with living organisms. Sodium alginate is employed in the formation of hydrogels in the presence of calcium chloride. N—P—K fertilizer helps with the nutrition and water retention of the plant. Yet, since sodium alginate crosslinks when exposed to calcium chloride, this allows for the formation of a sphere with a permeable membrane that has all the desired components of the present biodegradable encapsulated compound.

TABLE 3

Values of Ingredients for Preferred Embodiment A

| Ingredients | Percentage | Usage |
| --- | --- | --- |
| Calcium Chloride | 1%-5% | Encapsulate nutrients and water |
| Sodium Alginate | 1%-5% | Encapsulate nutrients and water |
| N-P-K Fertilizer | 0.1%-1% | Provide nutrients to the plant |
| H2O | 89%-97.9% | Water Supply |

Testing of this Embodiment with Plants

For characterization purposes, the bead's chosen were beads of 8 mm in diameter and weight of 0.61 grams. To characterize the bead, dwarf sunflower (*Helianthus gracilentus*) was chosen as the subject in bead experiment. This plant was chosen for its nutritional value, vertical growth, quick germination rate and capacity of adaptation and growth in most environments.

To further understand the validity of the effect of the beads on plant growth, we sought to determine the quantity of beads needed to have an optimal effect. To do this we conducted a dose response around concentrations (concentration=g of beads/Liters of soil), and through trial and error we have observed that plants grow appearing normal and with no signs of stress. The experiment was conducted at a greenhouse with semi controlled conditions (i.e., not thermal proof) in the southern part of Puerto Rico and 5 kg pod with soils were used for the support of the roots. The estimated typical concentration we have previously observed to successfully supplement the plants has been a 1:3 L (bead:soil) ratio, which results in a concentration of 307 g beads/L soil. This ratio is founded on the chemical composition of the beads themselves. The two chemicals that determine the rigidity of the beads are Sodium Alginate (Na $C_6O_8H_6$) and Calcium Chloride ($CaCl_2$). The rigidity of the bead is important to consider for two major reasons: (1) if it is too rigid, water and nutrients will not be transported onto the soil and (2) if it is too soft, the beads do not hold their shape and as such it becomes impossible to incorporate them into the soil or they desiccate at a fast rate. Of important note, the rigidity of the beads is inversely proportional to the percentage composition of sodium alginate in the solution. While varying water and sodium alginate percent compositions while keeping calcium chloride's and NPK (supplemental nutrients typical for plant growth) constant, we found that mixtures that comprise 7.5 g sodium alginate/Liter of water (H2O) and 10 g calcium chloride/L H2O and 3.33 g of NPK/L H2O in a total volume of 7 L of H2O yield beads that are both rigid enough to be handled and soft enough to release the water and nutrients into the soil. Plants grown at this bead composition did not show any phenotypic signs of stress of water deprivation.

We sought to quantify and to show the differential growth of the plants at different doses over the course of a 2-week period. The concentrations tested were 310 g of beads/L of soil, 150 g of beads/L of soil, 75 g of beads/L of soil, 37.5 g of beads/L of soil, 18.75 g of beads/L of soil, positive controls and negative controls. The positive control group were irrigated with distilled water (1 $inch^3$) and the negative controls were never watered. We also collected data on soil pH, soil humidity, and temperature (° F.). In order to accomplish these doses, we created a stock solution at a concentration of 310 g beads/L of soil (which also served as the upper end dose) in order to dilute it within the pots with additional bead-free soil to obtain the rest of the doses. We applied this method to measure the growth of dwarf sunflowers. After sewing the plants in a small tray, they were water daily by adding x mL of distilled water. We opted for distilled water in order to control for the nutrients added to the plants, which the beads contain. After germinations, we allowed the plants to grow until their first true pair of leaves sprouted, this process took 7 days. Prior to continuing experimentation, in order to prevent selection bias, we randomized the selection of 14 germinated plants (where each dose and control group was selected in duplicate, as such N=2×7 doses=14). To do this we conducted the analysis in R Studio (Version 3.5.2.1), with specific note to randomize without resampling and by excluding 3 plants that did not germinate. Once each pair of plants was assigned (with no particular order) to a dose group, they were transplanted into 7-gallon pots. We found that for the purposes of imaging of the growth, 5 kilograms of media (soil or soil+beads) was the optimal weight to add to the pots. We marked the plants at the closest place to the surface to soil as possible (in order to void measurement error) and used that as our baseline. From there, we monitored two outcomes: (1) stem diameter, and (2) intranodal growth. All of these measured, in conjunction, are gold standards for measuring plant growth.

Initially we aimed to evaluate the differential growth of dwarf sunflower at various concentrations (dose groups 1-5 were 310, 155, 77.5, 38.75, 19.375 g of beads/L of soil, respectively). However, our lowest dose (19.375 g beads/L of soil) behaved unpredictably and by day 9, one of our duplicates had already died. Given the aforementioned, we excluded that dose from our final analysis. We concluded that the water stress we observed in the plants of the previously mentioned dose, could be due to the low count of beads diluted in the soil and the fact that they may have dehydrated during the study period, making it impossible for the plant to receive a supply of water and nutrients to grow.

In addition, we allowed plants to adjust for two days to the new soil environment prior to taking measurements, given that transplantation could affect the plant's phenotype and adaptive behavior. This allowed us to obtain accurate measurements that were unaffected by hydric and/or physical stress occurring from re-planting. The weather can at times fluctuate from dry to wet weather and as such we experienced that by day 5 the plants suffered from hydric stress, which could be a result of the beads exhausting their supplies of water due to dehydration. The recorded environmental temperature and humidity were 90.16 (95% CI: 89.69, 90.63) and 53.59 (95% CI: 52.2, 54.99), respectively. For this reason, we added 100 mL of $H_2O$ around the root system of the plants to attempt to recover their typical phenotype. By the next day, the plants had returned to their typical, healthy appearance. Partially, therefore we measured absolute growth rather than relative. However, since we still added additional water (although a small amount), part of the growth could be attributed to such unexpected step. However, since the controls were watered every other day with 1,500 mL (i.e. 1.5 Liters), compared to the 100 mL added to recover the plants, with beads, from hydric stress, the potential of having obtained confounded growth measurements is unlikely.

Figure 3:
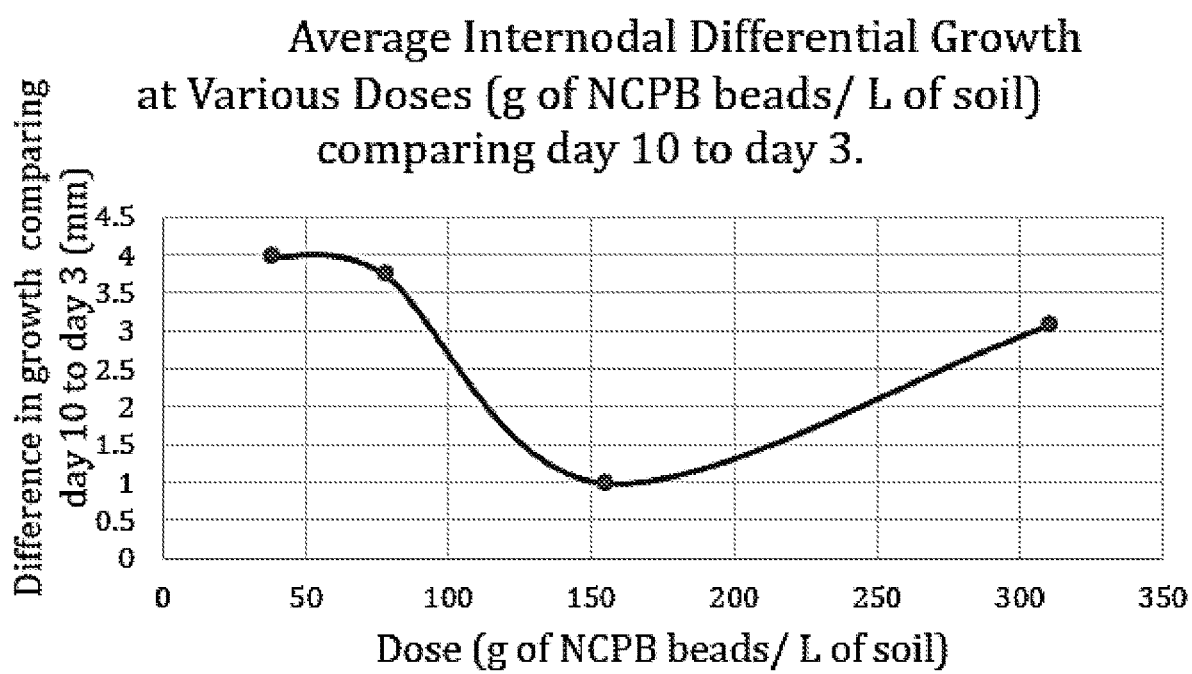
FIG. 3 shows the average internodal differential growth at various doses when using various bead:soil proportions.
Figure 4:
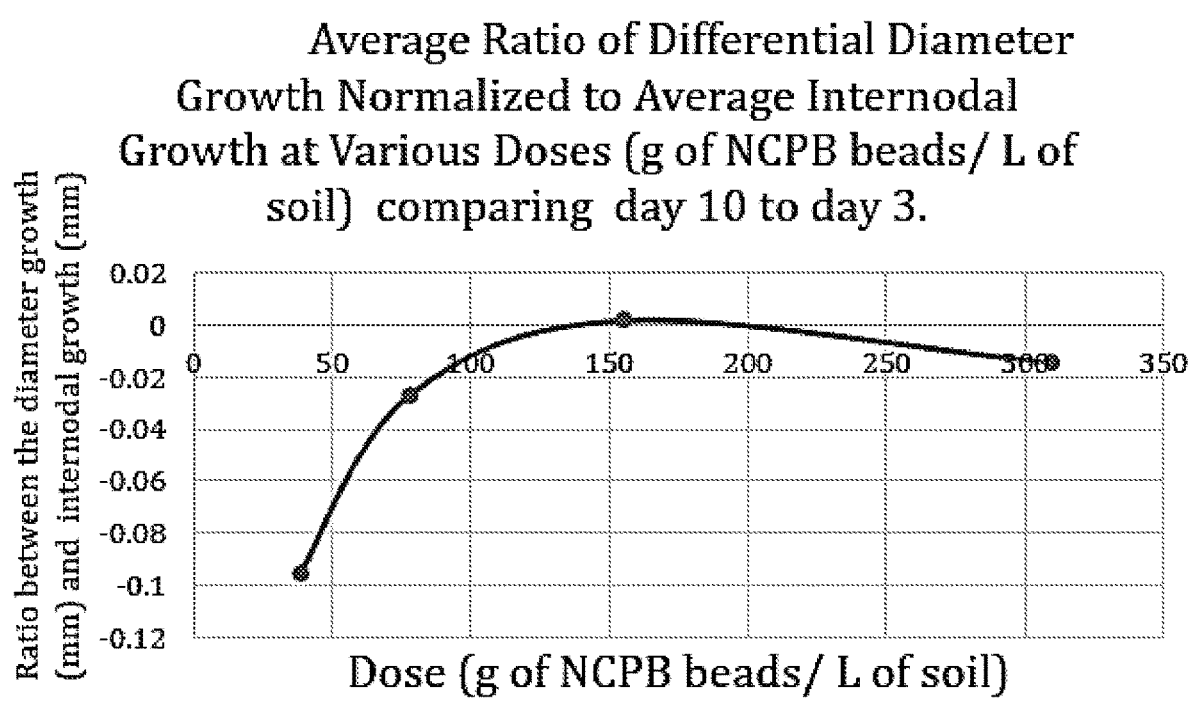
FIG. 4 shows the average ratio of differential diameter growth normalized to average internodal growth at various doses when using the bead:soil proportions.

FIGS. 3 and 4 show two independent efficient measurements of plant growth as we aimed to ensure our measurements were consistent and valid. Although none of the doses reached a statistically different significance we can observe positive diameter and ratio trends of growth as the dose of beads increases when compared to the controls. It is also a positive inference, given that the lack of statistical difference suggests our method is at the very least performing just as well as routine watering schemes, but less involved. Additionally, part of the reason why we didn't observe statistical difference could have been due to either the need for the additional 100 mL of $H_2O$ added due to hydric stress and or the short period of the pilot study. The justification for the short time period, had to do with the logistics and restrictions of the greenhouse facilities. This result has allowed us to look forward to enhancing our current technologies to surpass customary watering schemes as well as to address the fact that we added 100 mL of in the middle of the study period.

Figure 2:
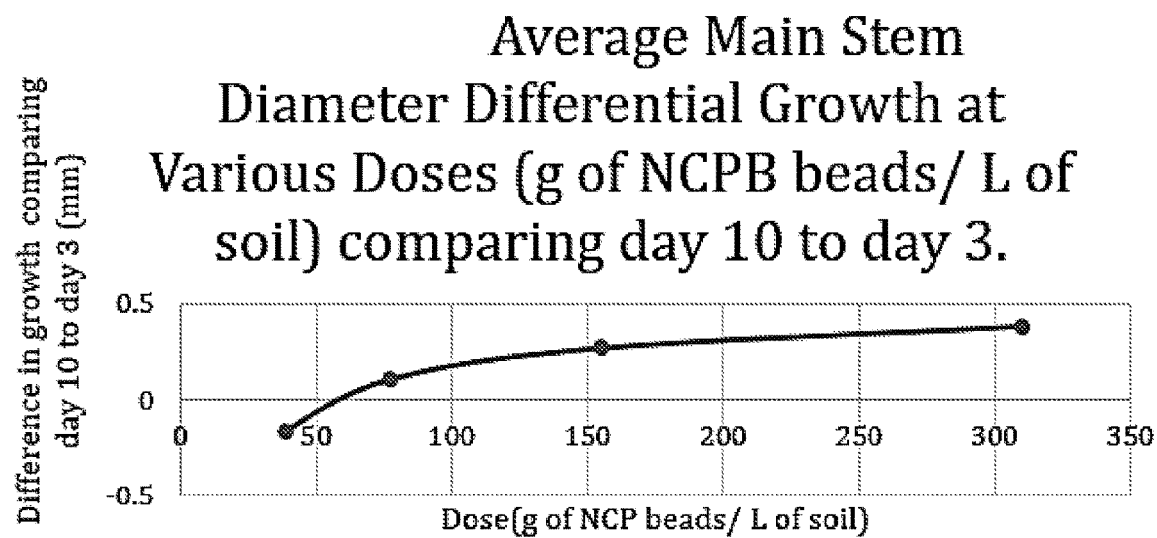
FIG. 2 shows the average main stem diameter differential growth at various doses when using various bead:soil proportions.

In FIG. 2 we note that the growth (measured as diameter of the main stem) is directly proportional to the dose. We do observe a "negative growth", meaning that the plant shrunk for one of the low doses over time. This could be due to hydric stress suffered by the plants in which case their structure changes during these episodes. Another possible explanation is related to the fact that this dose of beads in soil is simply not concentrated enough (e.g. enough beads distributed) to deliver water and nutrients efficiently to the plants. Interestingly, in FIG. 3 when considering internodal growth, the dose of 155 g of beads/L of soil, experiences the lowest differential growth comparing day 10 to day 3. We justify the selection of these days as we allowed the plants to recover from transplanting during day and for the fact that our first plant to die, did so during day 10. Although we aimed for a short pilot study, we expect the trend to increase over a longer period, if the experiment continued. It is of worth to mention that the "dip" in the dose response, could be due to the fact that the time frame of the study was short and perhaps the effect of the beads on plant growth had yet to normalize. Plants growth could be dependent on a possible lag period associated with the exposure to the beads and their mechanisms of delivery of water and nutrients. Given that this did not align with what we observed regarding the stem's thickness and how this relates to growth, we examined the ratio of diameter normalized by the internodal growth, under the assumption that there may be a dynamic role between stem diameter and internodal distance, when considering what those measurements imply for plant growth.

There is the potential of interaction between two individual mechanisms that summarize plant growth. Of note, in FIG. 4 we observe that when we consider the differential growth of these ratios, the dose of 155 g beads/L of soil is the only that experiences a positive change. It is important to clarify that some plants may reach a negative change, which seems unexpected. However, since we are testing for typical growth, it is possible that given the environmental temperatures recorded, the climate influenced the access plants had to water and nutrients.

Overall, we've observed positive trends in growth that is linearly increasing as the dose does. Following the fact, it's been shown that the beads can grow plants as well as routine watering approaches, however, Embodiment B proposed a modification to the chemical composition of the beads that would allow us to continue to remove any need for constant human-plant interaction. These next steps would result in an optimized technology that would prevent plant death due to limited access to water. We observed this during our pilot study when we lost a sample from the lowest dose treatment group, which was likely a result of dehydration. In Embodiment B we optimized the chemical composition of the beads to attain a much more valid and representative effect on plant growth. Here we demonstrate the optimal concentration that should be added to the soil to grow plants successfully. Although this is a small pilot study, we are confident in our results and their replicability. Of note, we allowed the plants to recover once transplanted, in order to avoid the stress of the process biasing our estimates. In addition, by day 3, the temperature at the greenhouse was annotated to be above 100° F., which can be a function of both the enclosed environment as well as the typical climate in Puerto Rico. For these reasons, on day 3 the plants seem stressed and depleted of water, as such we supplemented them with 100 mL of water to allow them to recover. It is our next step to further optimize our methods. Those steps can be found in the following section regarding Embodiment B.

Embodiment B

Figure 5:
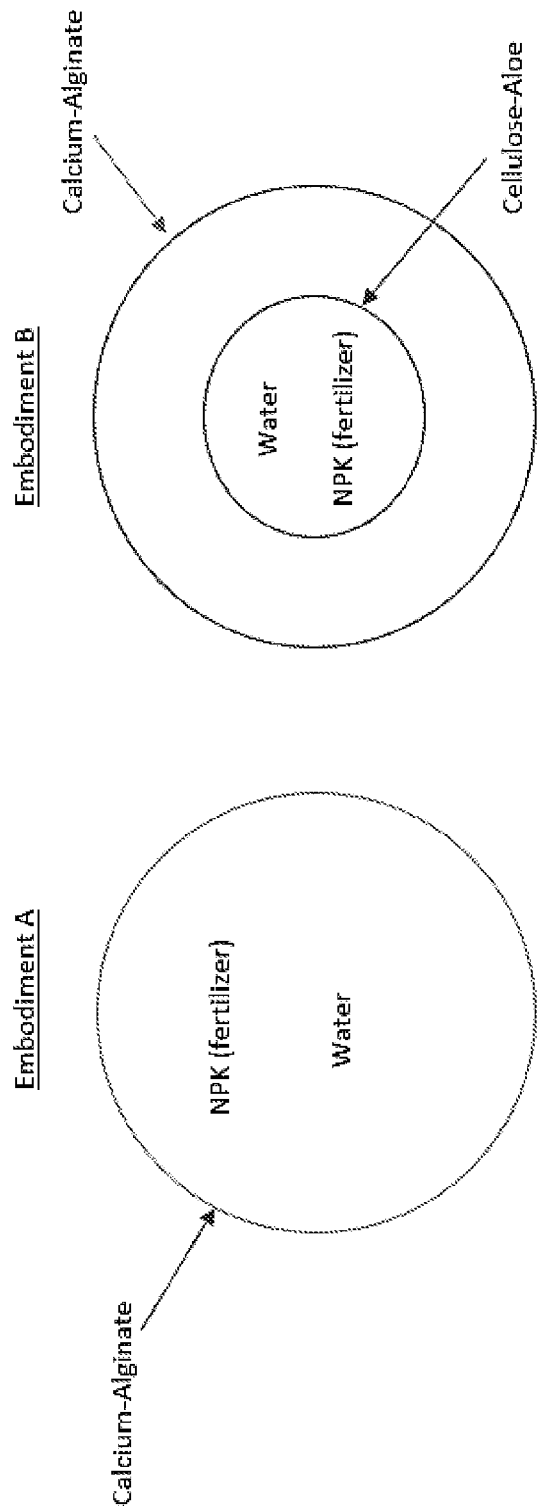
FIG. 5 shows a comparison between Embodiment A and Embodiment B of the bead.

The modification below shows an improvement of Embodiment A. Particularly as we highlighted in the "Testing of this embodiment with plants" section of embodiment A, the components of the beads are water, sodium alginate, calcium chloride and NPK. As previously noted, a limitation of that design was centered around the tradeoff between the percent of sodium alginate, rigidity and eventually water retention/release. Our preliminary dose response data on plant growth, suggested the appropriate concentration of beads per liter of soil that should be incorporated. To further optimize the bead's capacity to perform, a new design is suggested in which each bead, rather than having a single calcium-alginate outside layer, would now be modified to comprise two layers, Calcium-Alginate & Cellulose-Aloe. FIG. 5 shows a comparison between Embodiment A and Embodiment B. In particular, FIG. 5 shows that Embodiment A comprises a single layer of Calcium-Alginate; whereas Embodiment B comprises an outer layer of Calcium-Alginate and an inner layer of Cellulose-Aloe.

The outer layer of Calcium-Alginate will still be present, but it will not be the only factor responsible for retaining water within the bead. The Calcium-Alginate layer in Embodiment B is responsible for the export of water and additives enclosed within the bead. The nuance of this design is the incorporation of second encapsulation within the Calcium-Alginate which consists of cellulose and Aloe Vera which will be responsible for improving the water and fertilizer retention of the beads in order to improve/avoid: (1) the need to supplement the soil with additional water due to bead dehydration, (2) adding excess counts of beads in order to account for the water loss, (3) issues with the hindered transport of water and nutrients into the soil for the plant's consumption. These modifications will allow us to compensate for the limitations of the rigidity of the beads and its correlation to performance as to structural stability and transport phenomena between the inner bead and soil.

As explained below, Aloe Vera, Cellulose can improve the bead's performance of water absorption and rigidity, and as a consequence, prolong the shelf life of the bead. The Arbuscular mycorrhizal fungi (AMF) allow a more success rate of plant growth and yield if used as fertilizer substance inside the bead. The ideal product has all additional ingredients and enables constant release of water and nutrients to the soil, which is ideal for plant growth. Changing the percentages of additional ingredients below would just alter shelf life of the bead and the growth rate of plants.

TABLE 4

Values of Ingredients for Preferred Embodiment B

| Ingredients | Percentage | Usage |
| --- | --- | --- |
| Aloe Vera | 5.5%-10% | Water absorption |
| Cellulose/Cotton | 5.5%-10% | Rigid Structure. Cotton helps withstand high temperatures |
| Fertilizer product | 0.1%-1% | Plant Fertilizer can include N-P-K concentrations and/or arbuscular mycorrhizal fungi (AMF) |
| Sodium Alginate | 1%-5% | Encapsulate nutrients and water |
| Calcium Chloride | 1%-5% | Encapsulate nutrients and water |
| $H_2O$ | 69%-86.9% | Water supply |

An entirely natural product, Aloe Vera's high-water storage has made it the ideal candidate to develop a bead to retain water for plant growth with long shelf life. Cellulose, another naturally occurring polymer, has comparable water retention properties with the addition of good mechanical properties for purposes of swelling and shrinkage. Both biopolymers were combined in a variety of ratios and physical conditions to come up with the most effective conditions to deliver water to the plant. The developed bio-polymer (i.e., the bead) includes a solid portion comprised of mineral salts and a liquid portion comprised of the cellulose and Aloe Vera hydrogel beads. The reason for separating the bead into its two physical states is to preserve the compounds when stored since the water being carried in the hydrogel can react with the salts, thus altering its effectiveness.

Aloe Vera possesses a large water storage tissue from 99-99.5% of the plant. The remaining 0.5-1% are biologically active compounds such as minerals, enzymes, polysaccharides and vitamins among other organic compounds. To successfully transfer Aloe Vera soluble matter from its gel, it has to have higher superficial area. This can be achieved by breaking down the gel on a series of microbeads. This was explained by the probable displacement of Aloe Vera components from the penetration pathways and thereby it inhibits permeation of the gel components more effectively than the smaller compounds.

Alongside Aloe Vera, cellulose has great water retaining properties. Cellulose is the most abundant biopolymer on Earth consisting of β-1, 4-D-linked glucose chains $(C_6H_{10}O_5)_n$ present in various organisms like bacteria or plants. Some of it advantageous properties are that it is renewable, biodegradable, and non-toxic. The water retention for cellulose is due to so many available hydroxide (—OH) groups on its structure and can absorb up to 27 times its own weight.

In addition, cotton is a vegetable fabric and made from cellulose. Characteristics of cotton include absorbent and good strength due to higher degrees in polymerization and crystallinity. It can also withstand temperature below 475 degrees F. which makes it an ideal candidate for industrial farming and domestic applications. Thus, it is found that the high-water capacity of natural based products such as Aloe Vera, cotton and cellulose have the potential to develop a bead with a microbial enrichment system to aid the growth of plants.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A biopolymer-based capsule, comprising: a capsule, wherein said capsule comprises a shell that encapsulates a plurality of substances;
   wherein said shell is a biopolymer-based matrix comprising a combination of sodium alginate and calcium chloride;
   wherein sodium alginate is at least 1%-5% by weight of the capsule and wherein calcium chloride is at least 1%-5% by weight of the capsule; and
   wherein said shell comprises a plurality of biopolymer base matrices, wherein a first biopolymer base matrix includes a combination of Aloe Vera and cellulose and a second biopolymer base matrix includes a combination of sodium alginate and calcium chloride, wherein Aloe Vera is at least 5.5% by weight of the capsule, wherein cellulose is at least 5.5% by weight of the capsule.

2. The biopolymer-based capsule of claim 1, wherein a first substance of said plurality of substances is water and a second substance of said plurality of substances is a fertilizing material comprising an effective combination of Nitrogen, Phosphorus, and Potassium.

3. The biopolymer-based capsule of claim 2, wherein Nitrogen is at least 0.033% by weight of the capsule, Phosphorus is at least 0.033% by weight of the capsule, and Potassium is at least 0.033% by weight of said capsule.

4. The biopolymer-based capsule of claim 1, wherein said first biopolymer base matrix surrounds said second biopolymer base matrix and said first biopolymer base matrix is the outermost layer of said shell.

5. The biopolymer-based capsule of claim 4, wherein a first substance of said plurality of substances is water and second substance of said plurality of substances is a fertilizing material comprising a combination of Nitrogen, Phosphorus, and Potassium.

6. The biopolymer-based capsule of claim 5, wherein Nitrogen is at least 0.033% by weight, Phosphorus is at least 0.033% by weight, and Potassium is at least 0.033% by weight of said capsule.

7. The biopolymer-based capsule of claim 3 or 6, wherein the diameter of said capsule is between 4 millimeters and 15 millimeters.

* * * * *

UNITED STATES PATENT AND TRADEMARK OFFICE
CERTIFICATE OF CORRECTION

| | | |
|---|---|---|
| PATENT NO. | : 10,865,160 B2 | Page 1 of 1 |
| APPLICATION NO. | : 16/129393 | |
| DATED | : December 15, 2020 | |
| INVENTOR(S) | : Axel Garcia-Burgos et al. | |

It is certified that error appears in the above-identified patent and that said Letters Patent is hereby corrected as shown below:

On the Title Page

(72) Inventors: Name of second inventor reads:
"Yoliem S. Miranda-Alanon"

Should read:
"Yoliem S. Miranda-Alarcon"

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*